(12) United States Patent
Bzymek et al.

(10) Patent No.: US 10,371,069 B2
(45) Date of Patent: Aug. 6, 2019

(54) CONTROL SYSTEM FOR A FLEXIBLE FUEL INTERNAL COMBUSTION ENGINE

(71) Applicant: WESTPORT POWER INC., Vancouver (CA)

(72) Inventors: Raymond Bzymek, Northville, MI (US); Brian Chambers, Ann Arbor, MI (US); Mark E. Dunn, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 38 days.

(21) Appl. No.: 15/038,196

(22) PCT Filed: Nov. 6, 2014

(86) PCT No.: PCT/CA2014/051066
§ 371 (c)(1),
(2) Date: May 20, 2016

(87) PCT Pub. No.: WO2015/074143
PCT Pub. Date: May 28, 2015

(65) Prior Publication Data
US 2016/0290257 A1   Oct. 6, 2016

Related U.S. Application Data

(60) Provisional application No. 61/908,032, filed on Nov. 22, 2013.

(51) Int. Cl.
*F02D 19/06* (2006.01)
*F02D 19/08* (2006.01)
(Continued)

(52) U.S. Cl.
CPC ....... *F02D 41/0025* (2013.01); *F02D 19/061* (2013.01); *F02D 19/0644* (2013.01);
(Continued)

(58) Field of Classification Search
CPC ............... F02D 41/0025; F02D 19/061; F02D 19/0644; F02D 19/0692; F02D 19/0694;
(Continued)

(56) References Cited

U.S. PATENT DOCUMENTS 5,535,620 A * 7/1996 Nichols ................... F01N 11/00
                                                      701/105
5,937,800 A * 8/1999 Brown ...................... F02B 7/06
                                                      123/27 GE (Continued)

FOREIGN PATENT DOCUMENTS

DE    10 2006 043 243 A1   3/2008
DE    10 2011 088 497 A1   6/2013
(Continued)

OTHER PUBLICATIONS

International Search Report and Written Opinion, dated Jan. 29, 2015, for PCT/CA2014/051066, 8 pages.

(Continued)

*Primary Examiner* — David Hamaoui
*Assistant Examiner* — John D Bailey
(74) *Attorney, Agent, or Firm* — Seed IP Law Group LLP

(57) ABSTRACT

In previous control systems for engines that fuelled with a conventional fuel and an alternative fuel, a conventional fuel controller controlled fuelling for both fuels. This required extensive modifications to both the conventional fuel controller and an alternative fuel controller. A control system for an engine comprises a first control unit programmed to generate a first pulse width to actuate a first fuel injector to introduce a first fuel; a second control unit programmed to generate a second pulse width to actuate a second fuel injector to introduce a second fuel; and a communication line between the first and second control units. The first control unit determines a total fuel energy amount to be (Continued)

introduced by the first and second fuel injectors. The second control unit determines a first fraction of the total fuel energy amount to be from the first fuel and a second fraction of the total fuel energy amount to be from the second fuel.

21 Claims, 7 Drawing Sheets

(51) Int. Cl.
F02D 41/00 (2006.01)
F02D 41/26 (2006.01)
F02D 41/30 (2006.01)
F02D 41/40 (2006.01)

(52) U.S. Cl.
CPC ..... *F02D 19/0692* (2013.01); *F02D 19/0694* (2013.01); *F02D 19/08* (2013.01); *F02D 19/081* (2013.01); *F02D 41/26* (2013.01); *F02D 41/266* (2013.01); *F02D 41/3094* (2013.01); *F02D 41/40* (2013.01); *F02D 19/0647* (2013.01); *F02D 19/0689* (2013.01); *F02D 41/0027* (2013.01); *F02D 2400/11* (2013.01); *Y02T 10/36* (2013.01); *Y02T 10/44* (2013.01)

(58) Field of Classification Search
CPC ........ F02D 19/08; F02D 19/081; F02D 41/26; F02D 41/266; F02D 41/3094; F02D 41/40; F02D 19/0647; F02D 19/0689; F02D 41/0027; F02D 2400/11; Y02T 10/36; Y02T 10/44
USPC ....... 123/434, 525, 527, 575, 576, 578, 526, 123/577, 515, 482, 497, 308, 429, 431, 123/432, 445, 299, 300, 480, 496, 499, 123/500, 501, 304, 529, 654, 325; 701/103, 104, 114, 105
See application file for complete search history.

(56) References Cited

U.S. PATENT DOCUMENTS

| | | | | |
|---|---|---|---|---|
| 6,218,740 | B1* | 4/2001 | Mildice | H01R 31/005 307/10.1 |
| 6,289,871 | B1* | 9/2001 | Brown | F02D 19/0628 123/299 |
| 7,270,089 | B2* | 9/2007 | Wong | F02D 19/105 123/27 GE |
| 7,770,562 | B2* | 8/2010 | Pursifull | F02M 37/0088 123/446 |
| 7,913,673 | B2* | 3/2011 | Vanderslice | F02D 19/0631 123/27 GE |
| 8,498,799 | B2* | 7/2013 | Matthews, Jr. | F02D 41/3094 123/525 |
| 8,826,888 | B1* | 9/2014 | Kenney | F02B 47/02 123/25 C |
| 9,188,085 | B2* | 11/2015 | Fiveland | F02M 21/0284 |
| 9,212,618 | B2* | 12/2015 | Sivasubramanian | F02D 41/401 |
| 9,546,615 | B2* | 1/2017 | Melnyk | F02D 41/1454 |
| 9,752,515 | B1* | 9/2017 | Stroup | F02D 41/26 |
| 9,856,837 | B2* | 1/2018 | Dunn | F02M 43/00 |
| 2002/0007816 | A1* | 1/2002 | Zur Loye | F02B 1/04 123/295 |
| 2002/0040692 | A1* | 4/2002 | LaPointe | F02B 1/04 123/27 GE |
| 2003/0084877 | A1* | 5/2003 | Kabat | F02B 43/00 123/432 |
| 2003/0131827 | A1* | 7/2003 | Dobryden | F02D 19/061 123/480 |
| 2003/0168037 | A1* | 9/2003 | zur Loye | F02B 1/04 123/295 |
| 2004/0111210 | A1* | 6/2004 | Davis | F02D 19/027 701/103 |
| 2004/0149255 | A1* | 8/2004 | zur Loye | F02B 1/04 123/295 |
| 2005/0121005 | A1* | 6/2005 | Edwards | F02D 19/0631 123/525 |
| 2007/0000456 | A1* | 1/2007 | Wong | F02D 19/105 123/27 GE |
| 2007/0119415 | A1* | 5/2007 | Lewis | F01N 11/007 123/295 |
| 2009/0070008 | A1* | 3/2009 | Batenburg | F02D 19/027 701/103 |
| 2009/0271090 | A1* | 10/2009 | Surnilla | F02D 19/0628 701/103 |
| 2010/0147262 | A1* | 6/2010 | Martin | F02D 19/0647 123/299 |
| 2010/0292911 | A1* | 11/2010 | Cologna | F02D 41/0025 701/104 |
| 2010/0332106 | A1* | 12/2010 | Vanderslice | F02D 19/0631 701/103 |
| 2011/0088654 | A1* | 4/2011 | Courtoy | F02D 19/0647 123/299 |
| 2011/0132285 | A1* | 6/2011 | Pursifull | F01N 5/02 123/3 |
| 2011/0132323 | A1* | 6/2011 | Surnilla | F02D 19/0644 123/406.19 |
| 2011/0288745 | A1* | 11/2011 | Warner | F02D 41/0027 701/103 |
| 2011/0288751 | A1* | 11/2011 | Kurtz | F02O 41/0025 701/109 |
| 2012/0085326 | A1* | 4/2012 | Mo | F02O 19/061 123/526 |
| 2012/0136556 | A1* | 5/2012 | Magnusson | F02D 19/10 701/104 |
| 2012/0296552 | A1* | 11/2012 | Matthews, Jr. | F02D 41/3094 701/103 |
| 2013/0024094 | A1* | 1/2013 | Shaver | F02D 41/0025 701/104 |
| 2013/0046452 | A1* | 2/2013 | Moscherosch | F02D 19/061 701/103 |
| 2013/0103286 | A1* | 4/2013 | Guido | F02O 19/0602 701/103 |
| 2013/0158839 | A1* | 6/2013 | Striegel | F02D 19/10 701/103 |
| 2014/0123954 | A1* | 5/2014 | Lee | F02D 41/3094 123/478 |
| 2014/0331970 | A1* | 11/2014 | Bidner | F02D 19/0642 123/435 |
| 2015/0354472 | A1* | 12/2015 | Zhong | F02D 19/0642 123/445 |

FOREIGN PATENT DOCUMENTS

| | | |
|---|---|---|
| EP | 0 928 369 B1 | 5/2006 |
| WO | 99/45253 A1 | 9/1999 |
| WO | 2009/037476 A1 | 3/2009 |

OTHER PUBLICATIONS

Extended European Search Report, dated Jun. 20, 2017, for European Application No. 14864496.6-1603 / 3071822, 8 pages.

* cited by examiner

CONTROL SYSTEM FOR A FLEXIBLE FUEL INTERNAL COMBUSTION ENGINE

FIELD OF THE INVENTION

The present application relates to a control system for a flexible fuel internal combustion engine, and more specifically to a technique of controlling fuel injection in an internal combustion engine that is configured to operate using multiple fuels.

BACKGROUND OF THE INVENTION

Flexible fuel internal combustion engines are fuelled with one or more fuels. These engines can operate in a dual fuel mode where the engine is simultaneously fuelled with two different fuels. Alternatively or additionally, these engines can operate in a bi-fuel mode where the engine is configured to fuel with the two different fuels but only operates with one of these fuels at a time.

Conventional engines fuelled with liquid fuels (gasoline, diesel, ethanol etc.) include control systems (OEM control systems) in engine control units (ECU) that monitor and control engine operation and the introduction of the liquid fuels. Sensors monitoring various engine parameters provide signals to these OEM control systems that are input into algorithms that control engine performance. The algorithms output signals to control various actuators and fuel injectors to maintain certain engine parameters within predetermined thresholds. The OEM control systems have evolved over several decades and comprise advanced control techniques. These engines are being adapted to be additionally or alternatively fuelled with gaseous fuels (natural gas, liquefied natural gas, liquid propane gas, etc.), operating in the dual-fuel and/or bi-fuel modes.

Gaseous fuel control systems govern the delivery of gaseous fuel to fuel injectors and command these fuel injectors to introduce a predetermined quantity of gaseous fuel at a specific timing into intake air systems and/or combustion chambers. Sensors monitoring various parameters of a gaseous fuel supply system provide signals to the gaseous fuel control system representative of these parameters, and together with other engine parameters are input into algorithms that control engine performance and output signals to control various actuators and fuel injectors to maintain certain engine parameters within predetermined thresholds. The gaseous fuel control system comprises advanced techniques for controlling the combustion of gaseous fuel such that the demanded power and speed are met and emissions are maintained below predetermined thresholds.

U.S. Pat. No. 8,498,799, issued Jul. 30, 2013 to Matthews et al., the '799 patent, discloses a technique for controlling fuel injection in engines configured to operate using different fuels. An engine control module (ECM) controls the engine and also calculates a first fuel mass of a first fuel and a second fuel mass of a second fuel. The first fuel mass is introduced by a first fuel injection system that is commanded by the engine control module. The second fuel mass is introduced by a second fuel injection system that is commanded by a second control module. The second control module commands fuel injectors and other components in the second fuel injection system. Although the second control module can determine pulse widths used to actuate the fuel injectors based on the second fuel mass received from the first control module, the second control module does not comprise any algorithms for determining the quantity of the second fuel to be introduced or the timing at which the second fuel is introduced by the second fuel injection system.

United States Patent Publication No. US 2013/0103286, published on Apr. 25, 2013 by Guido et al., the '286 patent publication, discloses a technique of supplying fuel to an engine via multiple fuel paths. A controller receives signals from various sensors coupled to the engine, representative of conventional engine parameters, and commands second fuel injectors. A secondary controller receives pulse width information from the controller over a communication bus that it uses to actuate first fuel injectors. The first and second fuel injectors may be supplied with the same type of fuel, or different types of fuel. The secondary controller receives signals from temperature and pressure sensors employed to monitor a fuel that is introduced by the first fuel injectors, and can provide a signal to a fuel gauge. The controller broadcasts injector pulse widths, start of injector opening timing and/or stop of injector opening timing to the secondary controller that employs this information to actuate the first fuel injectors.

The second control module of '799 and the secondary controller of '286 can actuate gaseous fuel injectors in a multi-fuel engine. However, neither of these controllers comprises a gaseous fuel control system that determines the quantity of gaseous fuel and timing at which that quantity is introduced by gaseous fuel injectors.

A flexible fuel control system for a conventional liquid fuel and an alternative gaseous fuel comprises an OEM control system and a gaseous fuel control system. Each engine manufacturer has its own OEM control system designed for conventional liquid fuel operation that comprises different and/or proprietary algorithms that must interface and interoperate with a gaseous fuel control system in a flexible fuel control system. There is a need for a flexible fuel control system that reduces the changes required in each OEM control system in order to operate with a gaseous fuel control system.

SUMMARY OF THE INVENTION

An improved control system for an engine comprises a first control unit programmed to generate a first pulse width to actuate a first fuel injector to introduce a first fuel; a second control unit programmed to generate a second pulse width to actuate a second fuel injector to introduce a second fuel; and a communication line between the first and second control units. The first control unit determines a total fuel energy amount to be introduced by the first and second fuel injectors. The second control unit determines a first fraction of the total fuel energy amount to be from the first fuel and a second fraction of the total fuel energy amount to be from the second fuel. The first fuel can be a liquid fuel and the second fuel can be a gaseous fuel. The first fuel can be one of gasoline, diesel, ethanol and mixtures of these fuels. The second fuel can be at least one butane, ethane, hydrogen, methane, propane and natural gas and mixtures of these fuels. The first and second fuel injectors can be direct fuel injectors, or injectors that introduce fuel into an intake manifold. The communication line can be a dedicated link between the first control unit and the second control unit. In a preferred embodiment the communication line is a controller area network bus. The second control unit can be programmed to transfer injection timing information to the first control unit over the communication line.

In a preferred embodiment, the first control unit is further programmed to determine the first pulse width as a function of the first fraction of the total fuel energy amount, and the second control unit is further programmed to determine the second pulse width as a function of the second fraction of the total fuel energy amount.

In another preferred embodiment, the first control unit transfers the total fuel energy amount to the second control unit over the communication line. The total energy amount is one of a first quantity of the first fuel and a second quantity of the second fuel. The second control unit transfers at least one of the first fraction and the second fraction to the first control unit over the communication line. The first control unit can be further programmed to calculate a third quantity of the first fuel to be injected by the first fuel injector. Additionally, the first control unit can be further programmed to calculate a fourth quantity of the second fuel to be injected by the second fuel injector, and to transfer the fourth quantity to the second control unit over the communication line. Alternatively, the second control unit can be further programmed to calculate the fourth quantity of the second fuel to be injected by the second fuel injector. Additionally, the second control unit can be further programmed to calculate the third quantity of the first fuel to be injected by the first fuel injector, and to transfer the third quantity to the first control unit over the communication line.

In yet another preferred embodiment, the second control unit transfers at least one of the first fraction and the second fraction to the first control unit over the communication line. The first control unit can be further programmed to calculate a third quantity of the first fuel to be injected by the first fuel injector and a fourth quantity of the second fuel to be injected by the second fuel injector, and to transfer the fourth quantity to the second control unit over the communication line.

An improved control system for an engine comprising a first control unit programmed to generate a first pulse width to actuate a first fuel injector to introduce a first fuel; a second control unit programmed to generate a second pulse width to actuate a second fuel injector to introduce a second fuel; and a communication line allowing the first and second control units to exchange information. The first control unit is further programmed to determine a fuel mass as a function of engine operating conditions representative of a first quantity of the first fuel and a second quantity of the second fuel whereby a first energy amount of the first quantity equals a second energy amount of the second quantity within a predetermined range of tolerance; and to transfer the fuel mass to the second control unit over the communication line. The second control unit is further programmed to determine a fuel fraction as a function of at least one of the fuel mass, engine operating conditions, properties of the first fuel and properties of the second fuel. The fuel fraction is representative of a third quantity of the first fuel and a fourth quantity of the second fuel. The first energy amount is equal to a sum of a third energy amount of the third quantity of the first fuel and a fourth energy amount of the fourth quantity of the second fuel within a predetermined range of tolerance. The first pulse width is determined as a function of the third quantity of the first fuel and the second pulse width is determined as a function of the fourth quantity of the second fuel. The fuel fraction can be any parameter such that the third quantity of the first fuel and the fourth quantity of the second fuel can be determined based on the fuel mass, the properties of the first fuel and the properties of the second fuel. The fuel fraction can be one of a first fraction of the first quantity, a second fraction of the second quantity, the third quantity, the fourth quantity, a first fraction of the first energy amount, a second fraction of the second energy amount, the third energy amount, the fourth energy amount, a ratio between the third and fourth quantities, and a ratio between the third and fourth energy amounts.

In a preferred embodiment, the second control unit is further programmed to transfer the fuel fraction to the first control unit; and to calculate the fourth quantity of the second fuel as a function of at least two of the fuel mass, the fuel fraction and properties of the second fuel. The first control unit is further programmed to calculate the third quantity of the first fuel as a function of at least two of the fuel mass, the fuel fraction and properties of the first fuel.

In another preferred embodiment, the second control unit is further programmed to calculate the third quantity of the first fuel as a function of at least two of the fuel mass, the fuel fraction and properties of the first fuel; to calculate the fourth quantity of the second fuel as a function of at least two of the fuel mass, the fuel fraction and properties of the second fuel; and to transfer the third quantity of the first fuel to the first control unit.

DETAILED DESCRIPTION OF PREFERRED EMBODIMENT(S)

Figure 1:
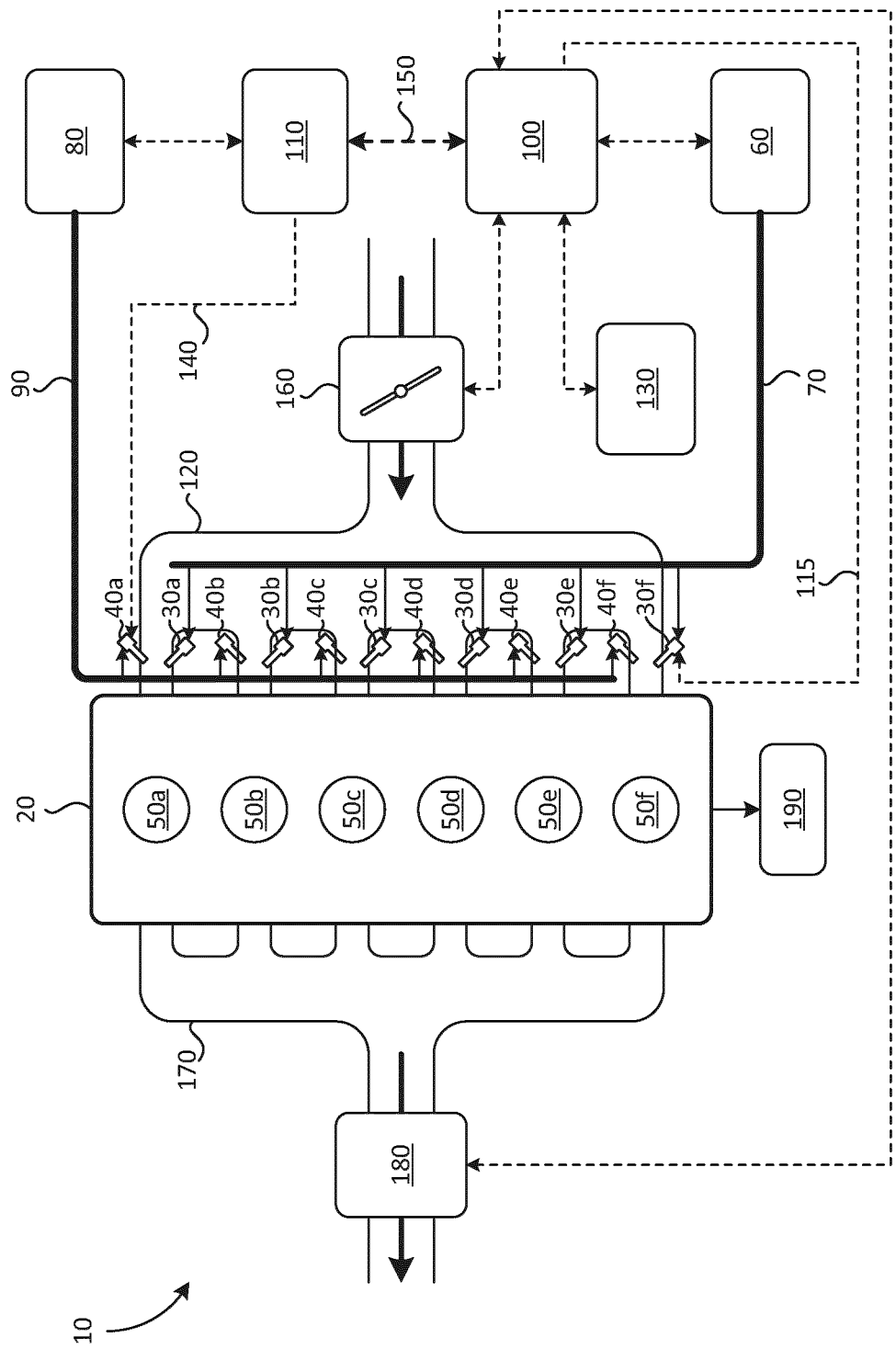
FIG. 1 is a schematic view of an engine system according to a first embodiment comprising first injectors for a first fuel and second injectors for a second fuel; a first control unit controls a first fuel supply system and actuates the first injectors to introduce the first fuel into respective combustion chambers through an intake air system; a second control unit controls a second fuel supply system and actuates the second injectors to introduce the second fuel into respective combustion chambers through the intake air system.

Referring to FIG. 1, there is shown engine system 10 comprising engine 20 that can be fuelled with a first fuel and/or a second fuel according to a first embodiment. Engine 20 is a flexible fuel internal combustion engine that can operate in at least one of a dual fuel mode and a bi-fuel mode. In a preferred embodiment the first fuel is a liquid fuel and the second fuel is a gaseous fuel. A liquid fuel is any fuel that is in a liquid state at standard temperature and pressure, and a gaseous fuel is any fuel that is in a gas state at standard temperature and pressure. In the context of this application standard temperature and pressure are defined as a temperature of 20° C. and a pressure of 1 bar. Exemplary liquid fuels are gasoline, diesel, ethanol and mixtures of these fuels, and exemplary gaseous fuels are butane, ethane, hydrogen, methane, propane, natural gas and mixtures of these fuels, among others. By way of example, in a preferred embodiment the first fuel comprises gasoline and the second fuel comprises methane.

First fuel supply system 60 supplies the first fuel through first fuel rail 70 to first fuel injectors 30a, 30b, 30c, 30d, 30e and 30f (30a-f). First control unit 100 is operatively connected with first fuel supply system 60 to monitor and control the delivery of the first fuel to first fuel rail 70. First control unit 100 is further connected with first fuel injectors 30a-f to actuate the first fuel injectors to introduce the first fuel into respective intake runners of intake manifold 120. Although only connection 115 is illustrated between first control unit 100 and first fuel injector 30f, it would be known by those familiar with the technology that there would also be similar connections between the first control unit and each one of first fuel injectors 30a-e. In the current embodiment first fuel injectors 30a-f are associated with respective intake runners and combustion chambers. In other embodiments one fuel injector can be associated with two or more intake runners and combustion chambers such that it is located further upstream whereby the first fuel can be distributed to respective intake runners. First control unit 100 is further connected with engine sensors 130 representative of a variety of engine sensors that monitor engine status and provide a plurality of signals to the first control unit representative of conventional engine parameters.

First control unit 100 can comprise both hardware and software components. The hardware components can comprise digital and/or analog electronic components. In the embodiments herein first control unit 100 comprises a processor and memories, including one or more permanent memories, such as FLASH, EEPROM and a hard disk, and a temporary memory, such as SRAM and DRAM, for storing and executing a program. As used herein, the terms algorithm, module and step refer to an application specific integrated circuit (ASIC), an electronic circuit, a processor (shared, dedicated, or group) and memory that execute one or more software or firmware programs, a combinational logic circuit, and/or other suitable components that provide the described functionality. The algorithms, modules and steps that are performed by first control unit 100 are part of the first control unit.

Second fuel supply system 80 supplies the second fuel through second fuel rail 90 to second fuel injectors 40a, 40b, 40c, 40d, 40e and 40f (40a-f). Second control unit 110 is operatively connected with second fuel supply system 80 to monitor and control the delivery of the second fuel to second fuel rail 90. Sensors (not shown) in second fuel supply system 80 provide signals to second control unit 110 representative of second fuel supply parameters, such as for example the temperature and pressure of the second fuel, among others. Second control unit 110 is further connected with second fuel injectors 40a-f to actuate the second fuel injectors to introduce the second fuel into respective intake runners of intake manifold 120. Although only connection 140 is illustrated between second control unit 110 and second fuel injector 40a, it would be known by those familiar with the technology that there would also be similar connections between the second control unit and each one of second fuel injectors 40b-f. In the current embodiment second fuel injectors 40a-f are associated with respective intake runners and combustion chambers. In other embodiments one fuel injector can be associated with two or more intake runners and combustion chambers such that it is located further upstream whereby the second fuel can be distributed to respective intake runners. Second control unit 110 is connected with first control unit 100 over communication line 150 such that information can be exchanged between the first and second control units. For example, first control unit 100 can send current values of engine parameters, received from engine sensors 130 and/or calculated by the first control unit, to second control unit 110, and the second control unit can send second fuel supply parameters to the first control unit. Communication line 150 can be an asynchronous communication bus or a synchronous communication bus, and can be a dedicated link or shared link with other system control units. When communication line 150 is a dedicated link between first and second control units 100 and 110, a more advanced type of communication line can be selected, for desired features such as increased communication bandwidth, reliability and/or increased tolerance to noise, without substantially increasing the cost since other system control units (not shown) do not need to provide an interface for this dedicated link. Communication line 150 can be a controller area network (CAN) bus, an Ethernet bus, a FlexRay bus, a time-triggered protocol (TTP) bus, a digital bus such as $I^2C$ and SPI, and other standard and proprietary buses. In a preferred embodiment communication line 150 is a CAN bus.

Second control unit 110 can comprise both hardware and software components. The hardware components can comprise digital and/or analog electronic components. In the embodiments herein second control unit 110 comprises a processor and memories, including one or more permanent memories, such as FLASH, EEPROM and a hard disk, and a temporary memory, such as SRAM and DRAM, for storing and executing a program. As used herein, the terms algorithm, module and step refer to an application specific integrated circuit (ASIC), an electronic circuit, a processor (shared, dedicated, or group) and memory that execute one or more software or firmware programs, a combinational logic circuit, and/or other suitable components that provide the described functionality. In preferred embodiments the algorithms, modules and steps that are performed by second control unit 110 are part of the second control unit.

Air is delivered into intake manifold 120 through throttle 160. A fuel-air charge is formed when the first fuel injected by first fuel injectors 30a-f and/or the second fuel injected by second fuel injectors 40a-f mixes with the air. The fuel-air charge is drawn into combustion chambers 50a, 50b, 50c, 50d, 50e and 50f (50a-f) through intake ports located at respective ends of the intake runners adjacent the combustion chambers. In other preferred embodiments engine system 10 can operate in the Diesel-cycle without throttle 160. Although six combustion chambers 50a-f are illustrated, the techniques described herein apply to other embodiments where there are one or more combustion chambers. The fuel-air mixture is ignited causing respective pistons (not shown) in combustion chambers 50a-f to reciprocate thereby imparting motive force to driveline 190 through a crankshaft (not shown) operatively connected with the pistons. Any ignition technique that can ignite the fuel-air mixture can be employed. Exhaust gases are directed out of combustion chambers 50a-f through exhaust manifold 170 and engine after-treatment system 180. In preferred embodiments, first control unit 100 is operatively connected with engine after-treatment system 180 to control the reduction of emissions. In other embodiments engine after-treatment system 180 may not be required if the emissions in the exhaust gases do not need to be reduced.

Figure 2:
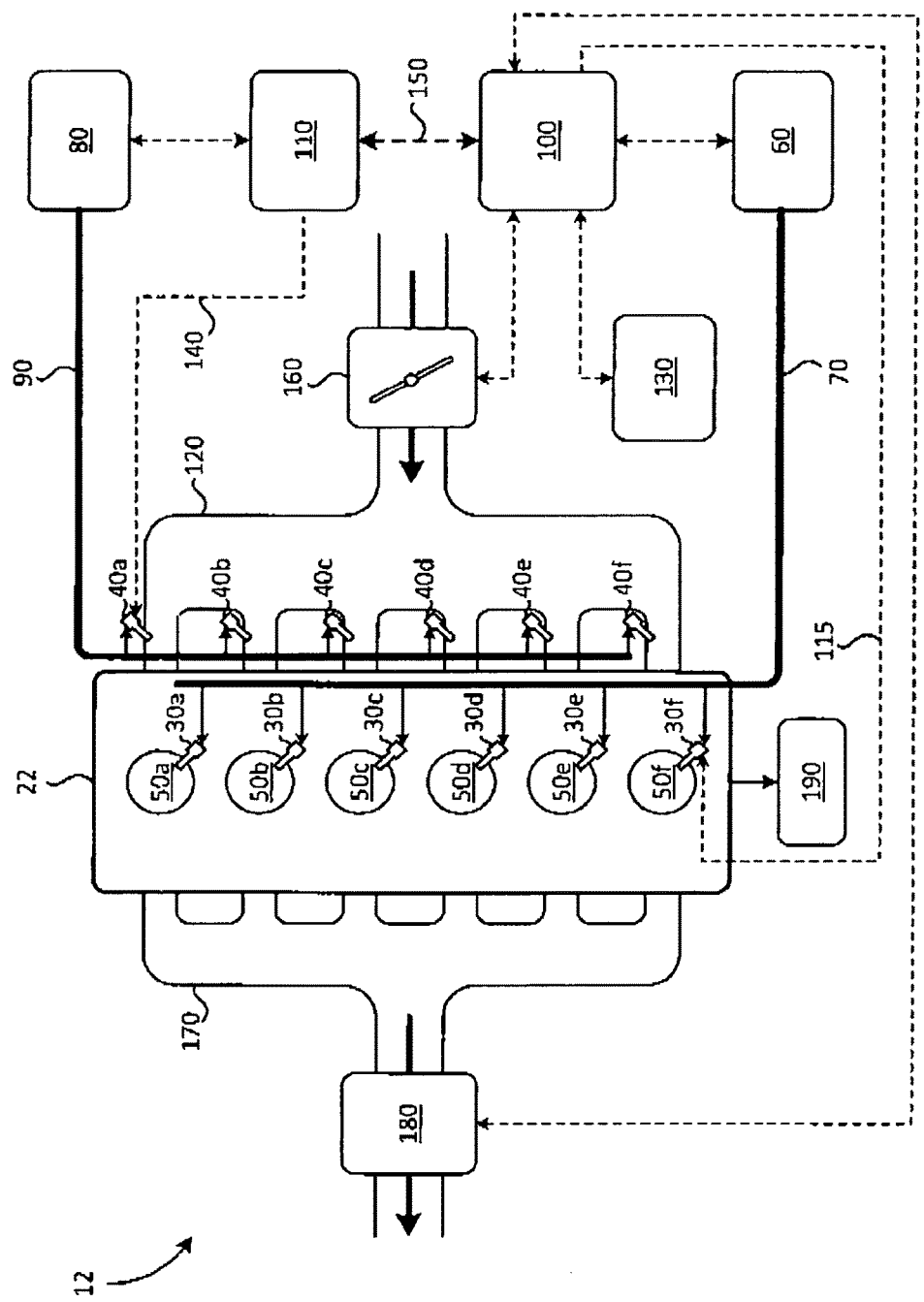
FIG. 2 is a schematic view of an engine system according to a second embodiment comprising first injectors for a first fuel and second injectors for a second fuel; a first control unit controls a first fuel supply system and actuates the first injectors to introduce the first fuel into respective combustion chambers through an intake air system; a second control unit controls a second fuel supply system and actuates the second injectors to introduce the second fuel into respective combustion chambers.

Referring now to FIG. 2 there is shown engine system 12 according to a second embodiment which is similar to the first embodiment where like parts in this embodiment and in all other embodiments have like reference numerals and may not be discussed in detail if at all. First fuel supply system 60 supplies the first fuel through first fuel rail 70 to first fuel injectors 30a-f, which are configured to directly introduce the first fuel into respective combustion chambers 50a-f in engine 22. In this description "direct injection" and "injecting directly into the combustion chamber" are phrases that describe methods for injecting fuel into the combustion chamber without passing through the intake valve that regulates flow from the intake runner into the combustion chamber. Accordingly, herein directly injected fuel includes fuel injected through a fuel injector into the combustion chamber and fuel that is injected into a pre-chamber before being introduced into the combustion chamber. It would be understood by someone skilled in the technology that first fuel injectors 30a-f of FIG. 2 have different characteristics and specifications compared to first fuel injectors 30a-f of FIG. 1, since there are different requirements for injecting fuel directly into combustion chambers compared to injecting fuel into an intake manifold. Returning to FIG. 2, since the first fuel is directly introduced into combustion chambers 50a-f, the pressure of the first fuel and the timing at which the first fuel is introduced may be different than when the first fuel is introduced into intake manifold 120. As a result, first fuel supply system 60 of FIG. 2 may have different characteristics and specifications compared to first fuel supply system 60 of FIG. 1.

Figure 3:
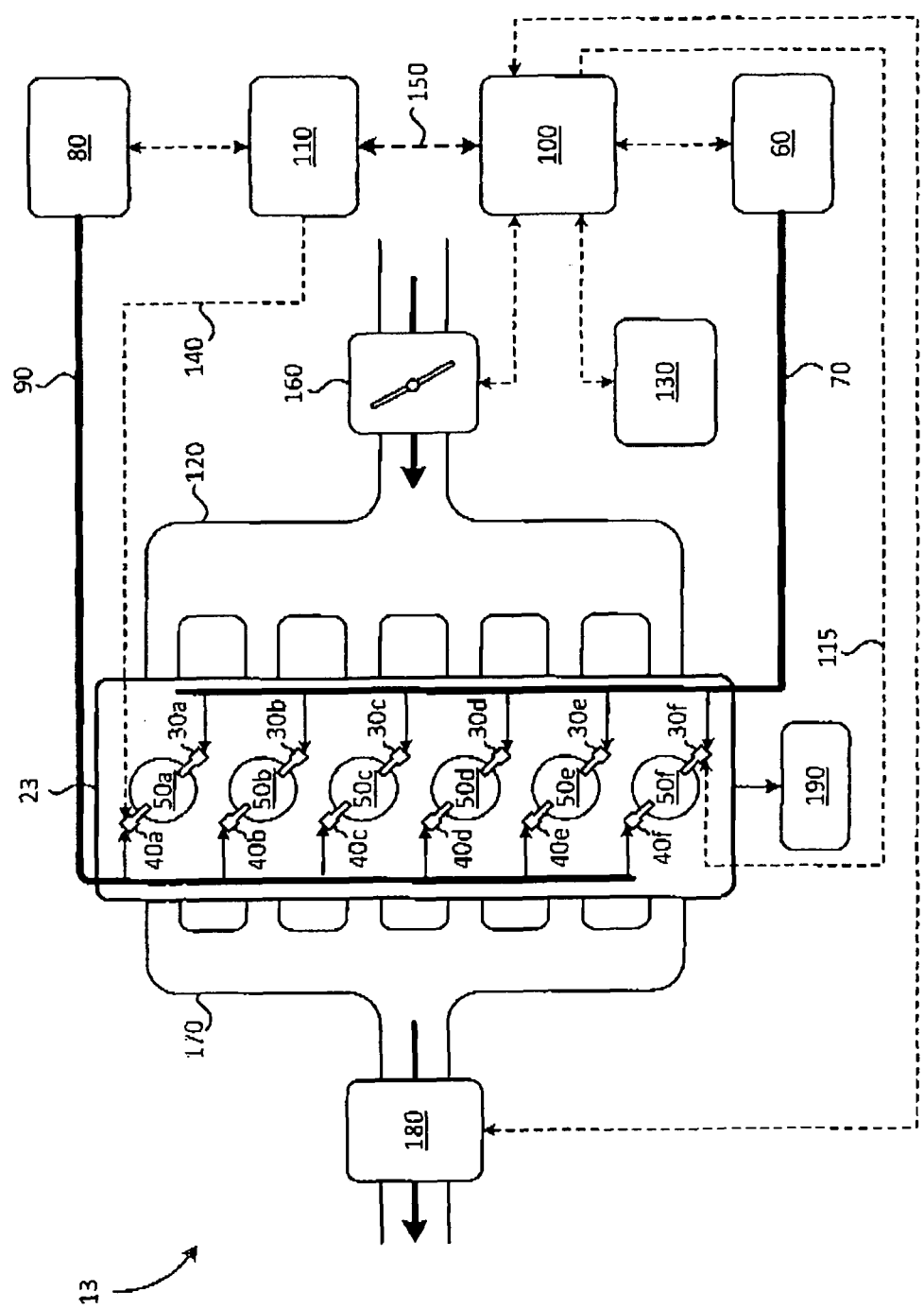
FIG. 3 is a schematic view of an engine system according to a third embodiment comprising first injectors for a first fuel and second injectors for a second fuel; a first control unit controls a first fuel supply system and actuates the first injectors to introduce the first fuel into respective combustion chambers; a second control unit controls a second fuel supply system and actuates the second injectors to introduce the second fuel into respective combustion chambers.

Referring now to FIG. 3 there is shown engine system 13 according to a third embodiment. First fuel supply system 60 supplies the first fuel through first fuel rail 70 to first fuel injectors 30a-f, which are configured to directly introduce the first fuel into respective combustion chambers 50a-f in engine 23. Second fuel supply system 80 supplies the second fuel through second fuel rail 90 to second fuel injectors 40a-f, which are configured to directly introduce the second fuel into respective combustion chambers 50a-f in engine 23. It would be understood by someone skilled in the technology that second fuel injectors 40a-f of FIG. 3 have different characteristics and specifications compared to second fuel injectors 40a-f of FIG. 1, since there are different requirements for injecting fuel directly into combustion chambers compared to injecting fuel into an intake manifold. Returning to FIG. 3, since the second fuel is directly introduced into combustion chambers 50a-f, the pressure of the second fuel and the timing at which the second fuel is introduced may be different than when the second fuel is introduced into intake manifold 120. As a result, second fuel supply system 80 of FIG. 3 may have different characteristics and specifications compared to second fuel supply system 80 of FIG. 1.

Figure 4:
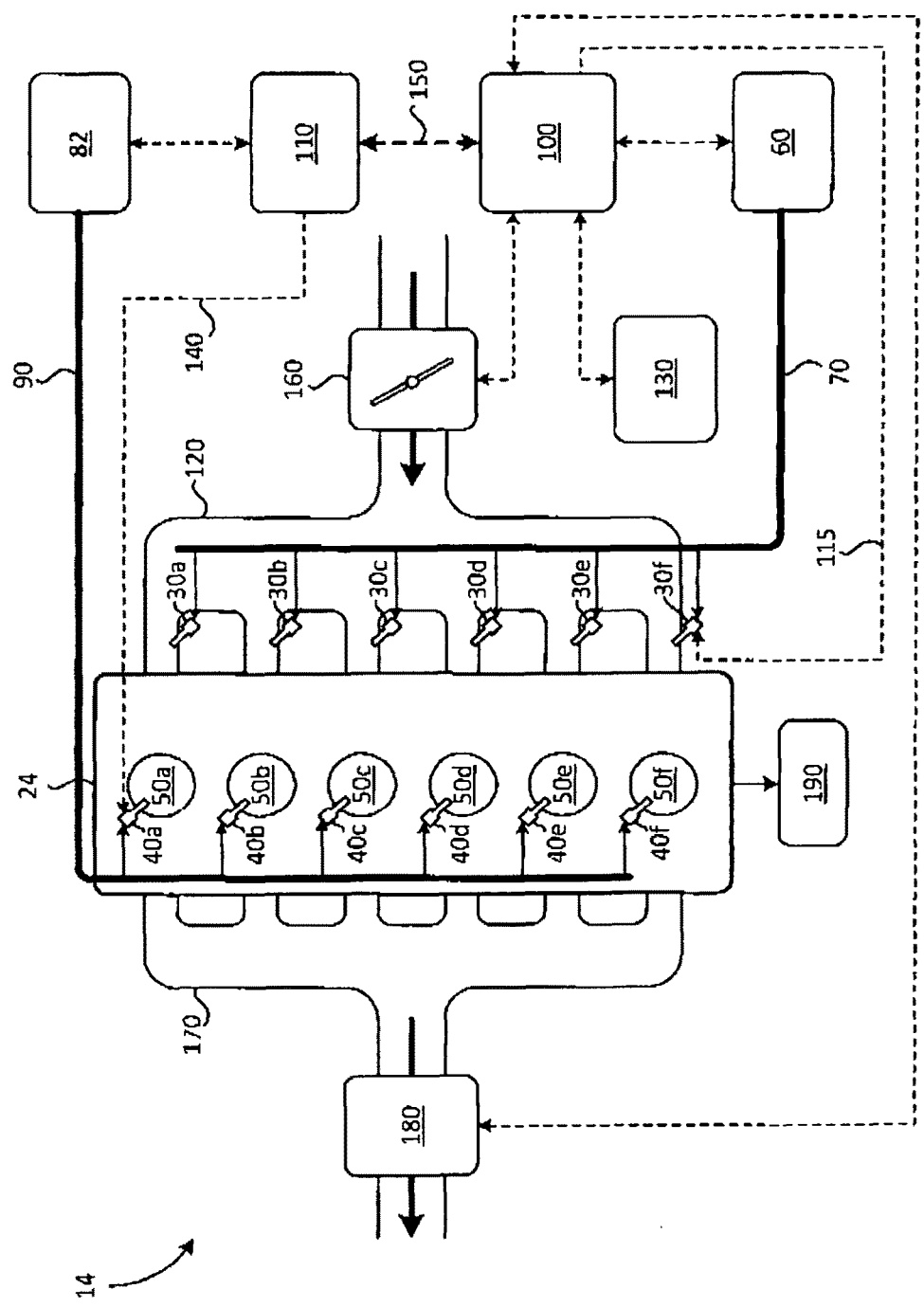
FIG. 4 is a schematic view of an engine system according to a fourth embodiment comprising first injectors for a first fuel and second injectors for a second fuel; a first control unit controls a first fuel supply system and actuates the first injectors to introduce the first fuel into respective combustion chambers; a second control unit controls a second fuel supply system and actuates the second injectors to introduce the second fuel into respective combustion chambers through an intake air system.

Referring now to FIG. 4 there is shown engine system 14 according to a fourth embodiment. First fuel injectors 30a-f introduce the first fuel into respective intake runners of intake manifold 120, and second fuel injectors 40a-f introduce the second fuel directly into respective combustion chambers 50a-f.

Each of the embodiments illustrated in FIGS. 1 through 4 shows a different arrangement for introducing the first and second fuels into respective combustion chambers, and while these different arrangements may influence the control strategies, the architecture for the control system is the same for all embodiments.

Figure 5:
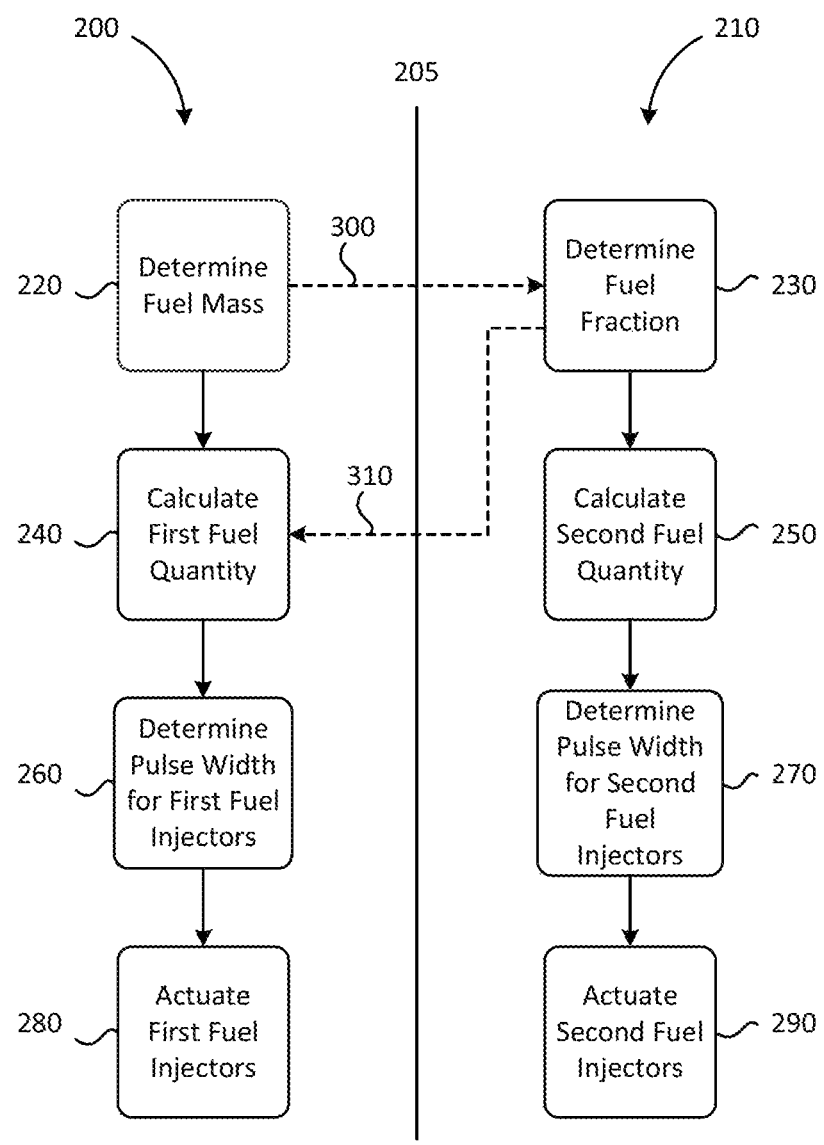
FIG. 5 is a flow chart diagram of a first algorithm and a second algorithm for controlling the introduction of the first and second fuels into respective combustion chambers of FIGS. 1 to 4 according to a first embodiment; the first algorithm is performed by the first control unit and the second algorithm is performed by the second control unit.

With reference to FIG. 5, a technique of operating engine systems 10, 12, 13 and 14 according to a first embodiment is now discussed. First algorithm 200, performed by first control unit 100, determines total fuel energy amount $(E_T)$ engines 20, 22, 23 and 24 are to be fuelled with to meet engine load and speed demand and actuates first fuel injectors 30a-f. Second algorithm 210, performed by second control unit 110, controls a first fraction of total fuel energy amount $(E_T)$ that is to be from the first fuel and a second fraction of total fuel energy amount $(E_T)$ that is to be from the second fuel and actuates second fuel injectors 40a-f. Demarcation line 205 is representative of the boundary between algorithms 200 and 210, and the dashed lines crossing line 205 are representative of information transferred across communication line 150 between first and second control units 100 and 110 (seen in FIGS. 1, 2, 3 and 4).

In step 220, first algorithm 200 determines a fuel mass as a function of engine operating conditions that is representative of a first quantity of the first fuel and a second quantity of the second fuel. When the fuel mass is the first quantity of the first fuel it is further determined as a function of properties of the first fuel, and when the fuel mass is the second quantity of the second fuel it is further determined as a function of properties of the second fuel. The properties of the first and second fuels refer to physical and/or chemical properties of these fuels respectively. In a preferred embodiment the fuel mass is the first quantity of the first fuel such that algorithm 200 does not require knowledge of the properties of the second fuel. The first quantity is an amount of the first fuel that engines 20, 22, 23 and 24 are to be fuelled with to meet engine load and speed demand without employing any of the second fuel. The second quantity is an amount of the second fuel that engines 20, 22, 23 and 24 are to be fuelled with to meet engine load and speed demand without employing any of the first fuel. Similarly, the fuel mass is representative of total fuel energy amount $(E_T)$ required to meet engine load and speed demand. With reference to equation 1, total fuel energy amount $(E_T)$ is equal to a first energy amount $(E_1)$ of the first quantity of the first fuel, and is also equal to a second energy amount $(E_2)$ of the second quantity of the second fuel. First and second energy amounts $(E_1)$ and $(E_2)$ represent the energy derived from the combustion of the first and second quantities of the first and second fuels respectively. The fuel mass, or the like, is communicated to second control unit 110 via communication line 150 and the communication is represented by information transfer 300.

$$E_T = E_1 = E_2 \qquad \text{equation 1}$$

Second control unit 110 receives the fuel mass from first control unit 100, and in step 230 second algorithm 210 determines a fuel fraction as a function of at least one of the fuel mass, engine operating conditions, properties of the first fuel and properties of the second fuel. For example, the fuel fraction can be determined based on time since engines 20, 22, 23 and 24 started, the temperature of first fuel injectors 30a-f and second fuel injectors 40a-f (particularly when these injectors are direct injectors), user selection of fuel, total load, the quantity of the second fuel remaining (such as determined by second fuel pressure and/or level), by an output of a vehicle location module programmed to determine distance to fuelling stations for the first and/or second fuels, and by algorithms that improve engine and vehicle operation (fuel system protection, range improvement, cost per mile). If available it is advantageous that second control unit 110 have knowledge of how engines 20, 22, 23 and 24 respond to the first fuel and the second fuel to more accurately evaluate equivalent energy at the crank output. In addition the air-fuel ratio for the first fuel can be different than the air-fuel ratio for the second fuel, which can influence the fuel fraction determination. The fuel fraction is representative of a third quantity of the first fuel that is to be injected by first fuel injectors 30a-f and a fourth quantity of the second fuel that is to be injected by second fuel injector 40a-f in one engine cycle respectively. In a preferred embodiment the fuel fraction is a ratio between the third and first quantities of the first fuel representing the fraction of the fuel mass that is to be injected by first fuel injectors 30a-f. The third quantity of the first fuel has associated with it third energy amount ($E_3$), and the fourth quantity of the second fuel has associated with it fourth energy amount ($E_4$). Third and fourth energy amounts ($E_3$) and ($E_4$) represent the energy derived from the combustion of the third and fourth quantities of the first and second fuels respectively. The first, second, third and fourth quantities are associated with each other according to equation 2. First energy amount ($E_1$) of the first quantity is equal to second energy amount ($E_2$) of the second quantity, and both are equal to the sum of third energy amount ($E_3$) of the third quantity and fourth energy amount ($E_4$) of the fourth quantity, within a predetermined range of tolerance. The fuel fraction can be any parameter such that the third quantity of the first fuel and the fourth quantity of the second fuel can be determined when knowing the fuel mass, the properties of the first fuel and the properties of the second fuel. For example, the fuel fraction can be a first fraction of the first quantity, a second fraction of the second quantity, the third quantity of the first fuel, the fourth quantity of the second fuel, a first fraction of total fuel energy amount ($E_T$) to be from the first fuel, a second fraction of total fuel energy amount ($E_T$) to be from the second fuel, a fraction of first energy amount ($E_1$), a fraction of second energy amount ($E_2$), the third energy amount, the fourth energy amount, a ratio between the third and fourth quantities, and a ratio between the third and fourth energy amounts. The fuel fraction is communicated to first control unit 110 via communication line 150 and the communication is represented by information transfer 310.

$$E_T = E_1 = E_2 = E_3 + E_4 \qquad \text{equation 2}$$

First algorithm 200 calculates the third quantity of the first fuel as a function of at least two of the fuel mass, the fuel fraction, properties of the first fuel and properties of the second fuel in step 240, and in step 260 first pulse widths for actuating first fuel injectors 30a-f are determined based on the third quantity. Second algorithm 210 calculates the fourth quantity of the second fuel as a function of at least two of the fuel mass, the fuel fraction, properties of the first fuel and properties of the second fuel in step 250, and in step 270 second pulse widths for actuating second fuel injectors 40a-f are determined based on the fourth quantity. First fuel injectors 30a-f are actuated by first control unit 100 in step 280 and second fuel injectors 40a-f are actuated by second control unit 110 in step 290.

Figure 6:
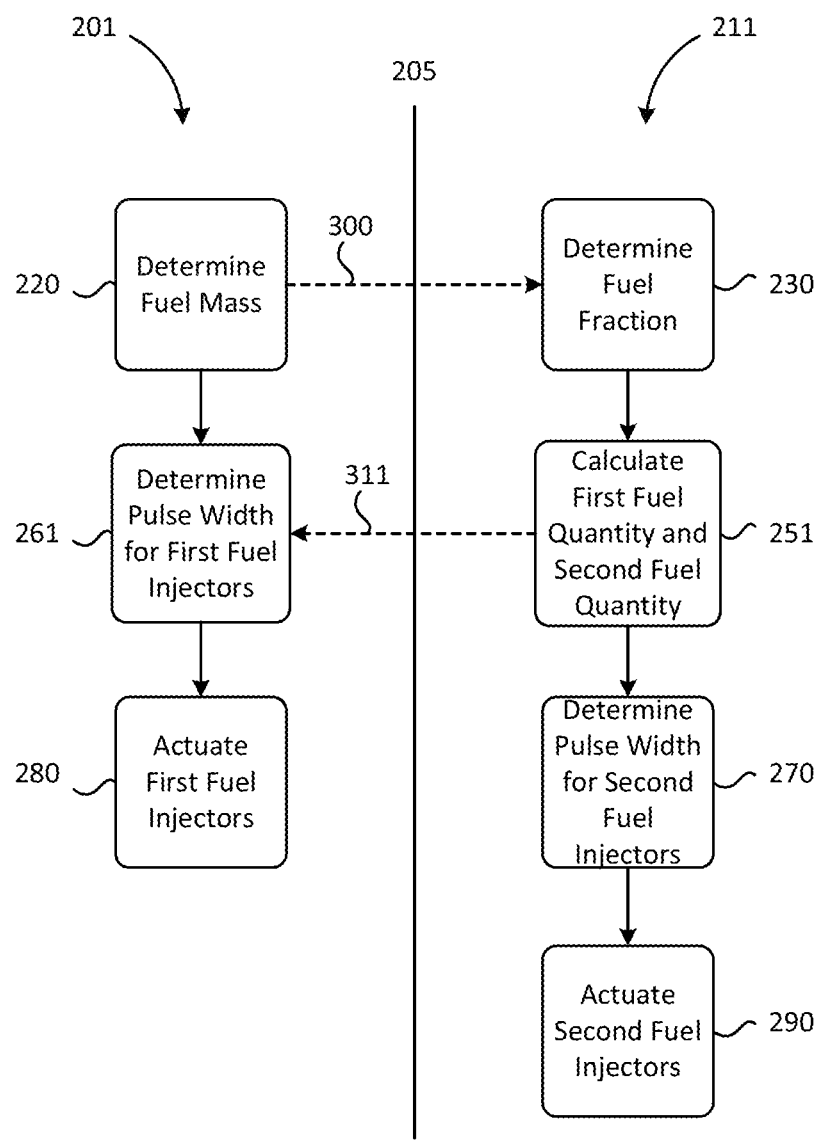
FIG. 6 is a flow chart diagram of a first algorithm and a second algorithm for controlling the introduction of the first and second fuels into respective combustion chambers of FIGS. 1 to 4 according to a second embodiment; the first algorithm is performed by the first control unit and the second algorithm is performed by the second control unit.

Referring now to FIG. 6, a technique for operating engine systems 10, 12, 13 and 14 according to a second embodiment that is similar to the previous technique of FIG. 5 is now discussed. First algorithm 201 is performed by first control unit 100 and is similar to algorithm 200. Second algorithm 211 is performed by second control unit 110 and is similar to algorithm 210. In step 251, the fourth quantity of the second fuel is calculated as a function of the fuel mass, the fuel fraction and properties of the second fuel, which is similar to step 250. Additionally in step 251, the third quantity of the first fuel is calculated as a function of the fuel mass, the fuel fraction and properties of the first fuel. The third quantity of the first fuel is communicated to first control unit 100 via communication line 150 and the communication is represented by information transfer 311. The remaining steps in algorithms 201 and 211 are similar to those in algorithms 200 and 210.

Figure 7:
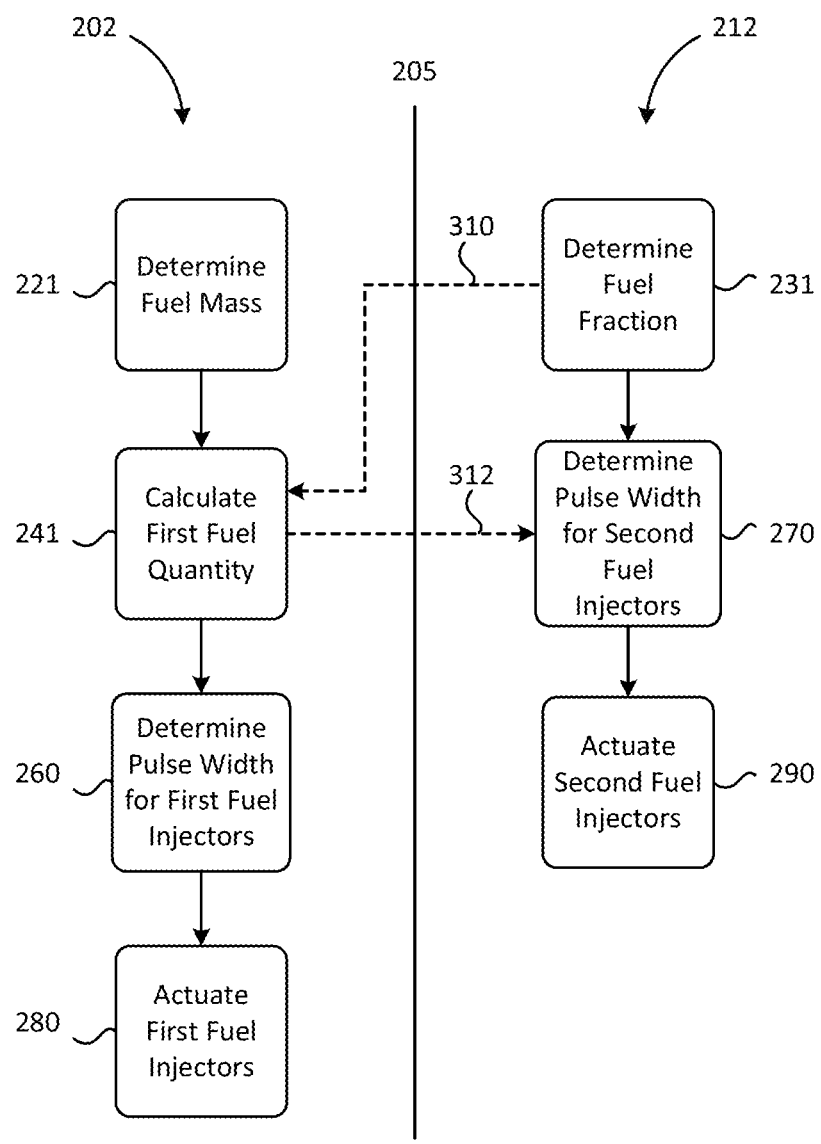
FIG. 7 is a flow chart diagram of a first algorithm and a second algorithm for controlling the introduction of the first and second fuels into respective combustion chambers of FIGS. 1 to 4 according to a third embodiment; the first algorithm is performed by the first control unit and the second algorithm is performed by the second control unit.

Referring now to FIG. 7, another technique for operating engine systems 10, 12, 13 and 14 according to a third embodiment that is similar to the previous technique of FIG. 5 is now discussed. Step 221 is similar to previous step 220, but in this embodiment the fuel mass, or the like, is not communicated to second control unit 110. Step 231 is similar to previous step 230, but in this embodiment the fuel fraction is calculated as a function of at least one of engine operating conditions, properties of the first fuel and properties of the second fuel, but not as a function of the fuel mass. In step 241, the third quantity of the first fuel is calculated as a function of the fuel mass, the fuel fraction and properties of the first fuel, which is similar to step 240. Additionally in step 241, the fourth quantity of the second fuel is calculated as a function of the fuel mass, the fuel fraction and properties of the second fuel. The fourth quantity of the second fuel is communicated to second control unit 110 via communication line 150 and the communication is represented by information transfer 312. The remaining steps in algorithms 202 and 212 are similar to those in algorithms 200 and 210.

Additional information can be included in information transfers 310 and 311 of the heretofore described techniques of FIGS. 5, 6 and 7. Information transfers 310 and 311 comprise communicating the fuel fraction to first control unit 100 from second control unit 110. Additionally, timing information related to injection of the first fuel can be determined within second control unit 110 in steps 230 and 231, and this timing information can be communicated to the first control unit 110 in information transfers 310 and 311. The timing information related to injection of the first fuel can comprise start of injection timing, end of injection timing, and number of pulses (injection events). Normally, second control unit 110 does not comprise knowledge regarding the characteristics of first fuel injectors 30a-f, and therefore pulse width information is not determined in second control unit 110.

Algorithms 200, 201 and 202 can be part of OEM control systems deployed in first control unit 100. Algorithms 210, 211 and 212 can be part of a gaseous fuel control system deployed in second control unit 110. These algorithms have the advantages of requiring relatively few changes to the OEM control systems, which is advantageous for deploying such a control system with a variety of engine manufacturers to enable engines designed to operate only with conventional liquid fuel, to operate as a flexible fuel engine. Combustion control strategies in the gaseous fuel control system remain in second control unit 110 and do not need to be deployed to first control unit 100. First control unit 100 does not require hardware changes since sensor signals in second fuel supply system 80 do not need to be received directly by the first control unit and second fuel injectors 40a-f do not need to be actuated by the first control unit. Second control unit 110 receives these sensor signals and actuates the second fuel injectors. Furthermore, extra processing power and/or increased memory are not required for first control unit 100 since algorithms 210 and 211 are performed by second control unit 110. The information exchanged between first control unit 100 and second control unit 110 is over a CAN bus, in a preferred embodiment, which is already present in the majority of engines systems currently manufactured.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A control system for an engine comprising:
   a first fuel injector;
   a first connection connected with the first fuel injector;
   a first control unit connected with the first connection and programmed to generate a first pulse width, which in operation is delivered to the first fuel injector over the first connection to actuate the first fuel injector to introduce a first fuel;
   a second fuel injector;
   a second connection connected with the second fuel injector;
   a second control unit connected with the second connection and programmed to generate a second pulse width, which in operation is delivered to the second fuel injector over the second connection to actuate the second fuel injector to introduce a second fuel; and
   a communication bus allowing the first and second control units to exchange information;
   wherein the first control unit is further programmed to determine a total fuel energy amount to be introduced by the first and second fuel injectors and to transfer the total fuel energy amount to the second control unit over the communication bus,
   wherein the second control unit is further programmed to determine a first fraction of the total fuel energy amount to be from the first fuel and a second fraction of the total fuel energy amount to be from the second fuel.

2. The control system of claim 1, wherein the first control unit is further programmed to determine the first pulse width as a function of the first fraction of the total fuel energy amount, and the second control unit is further programmed to determine the second pulse width as a function of the second fraction of the total fuel energy amount.

3. The control system of claim 1, wherein at least one of:
   the first fuel is a liquid fuel and the second fuel is a gaseous fuel;
   the first fuel is one of gasoline, diesel, ethanol and mixtures of these fuels; and
   the second fuel is at least one of butane, ethane, hydrogen, methane, propane and natural gas and mixtures of these fuels.

4. The control system of claim 1, wherein the communication bus is a dedicated link between the first control unit and the second control unit.

5. A control system for an engine comprising:
   a first fuel injector;
   a first connection connected with the first fuel injector;
   a first control unit connected with the first connection and programmed to generate a first pulse width, which in operation is delivered to the first fuel injector over the first connection to actuate the first fuel injector to introduce a first fuel;
   a second fuel injector;
   a second connection connected with the second fuel injector;
   a second control unit connected with the second connection and programmed to generate a second pulse width, which in operation is delivered to the second fuel injector over the second connection to actuate the second fuel injector to introduce a second fuel; and
   a communication bus allowing the first and second control units to exchange information;
   wherein the first control unit is further programmed to determine a total fuel energy amount to be introduced by the first and second fuel injectors and to transfer the total fuel energy amount to the second control unit over the communication bus,
   wherein the second control unit is further programmed to determine a first fraction of the total fuel energy amount to be from the first fuel and a second fraction of the total fuel energy amount to be from the second fuel, and
   wherein the first control unit transfers the total fuel energy amount to the second control unit over the communication bus, and the total energy amount is one of a first quantity of the first fuel and a second quantity of the second fuel.

6. The control system of claim 5, wherein the second control unit transfers at least one of the first fraction and the second fraction to the first control unit over the communication bus.

7. The control system of claim 6, wherein the first control unit is further programmed to calculate a third quantity of the first fuel to be injected by the first fuel injector.

8. The control system of claim 7, wherein the first control unit is further programmed to calculate a fourth quantity of the second fuel to be injected by the second fuel injector, and the first control unit transfers the fourth quantity to the second control unit over the communication bus.

9. The control system of claim 7, wherein the second control unit is further programmed to calculate a fourth quantity of the second fuel to be injected by the second fuel injector.

10. The control system of claim 5, wherein the second control unit is further programmed to calculate a third quantity of the first fuel to be injected by the first fuel injector and a fourth quantity of the second fuel to be injected by the second fuel injector, and the second control unit transfers the third quantity to the first control unit over the communication bus.

11. The control system of claim 1, wherein the second control unit transfers injection timing information to the first control unit over the communication bus.

12. A control system for an engine comprising:
a first fuel injector;
a first connection connected with the first fuel injector;
a first control unit connected with the first connection and programmed to generate a first pulse width, which in operation is delivered to the first fuel injector over the first connection to actuate the first fuel injector to introduce a first fuel;
a second fuel injector;
a second connection connected with the second fuel injector;
a second control unit connected with the second connection and programmed to generate a second pulse width delivered over the second connection to actuate the second fuel injector to introduce a second fuel; and
a communication bus allowing the first and second control units to exchange information;
wherein the first control unit is further programmed to determine a total fuel energy amount to be introduced by the first and second fuel injectors and to transfer the total fuel energy amount to the second control unit over the communication bus;
wherein the second control unit is further programmed to determine a first fraction of the total fuel energy amount to be from the first fuel and a second fraction of the total fuel energy amount to be from the second fuel, and
wherein the second control unit transfers at least one of the first fraction and the second fraction to the first control unit over the communication bus.

13. The control system of claim 12, wherein the first control unit is further programmed to calculate a third quantity of the first fuel to be injected by the first fuel injector and a fourth quantity of the second fuel to be injected by the second fuel injector, and the first control unit transfers the fourth quantity to the second control unit over the communication bus.

14. A control system for an engine comprising:
a first control unit programmed to generate a first pulse width to actuate a first fuel injector to introduce a first fuel;
a. second control unit programmed to generate a second pulse width to actuate a second fuel injector to introduce a second fuel; and
a communication line allowing the first and second control units to exchange information;
wherein the first control unit is further programmed to:
determine a fuel mass as a function of engine operating conditions representative of a first quantity or the first fuel and a second quantity of the second fuel whereby a first energy amount of the first quantity equals a second energy amount of the second quantity within a predetermined range of tolerance; and
transfer the fuel mass to the second control unit over the communication line;

wherein the second control unit is further programmed to determine a fuel fraction as a function of at least one of the fuel mass, engine operating conditions, properties of the first fuel and properties of the second fuel, the fuel fraction representative of a third quantity of the first fuel and a fourth quantity of the second fuel, the first energy amount is equal to a sum of a third energy amount of the third quantity of the first fuel and a fourth energy amount of the fourth quantity of the second fuel within a predetermined range of tolerance;
wherein the first pulse width is determined as a function of the third quantity of the first fuel and the second pulse width is determined as a function of the fourth quantity of the second fuel.

15. The control system of claim 14, wherein at least one of:
the first fuel injector introduces the first fuel into an intake manifold of the engine; and
the second fuel injector introduces the second fuel into the intake manifold of the engine.

16. The control system of claim 14, wherein the second control unit is further programmed to:
transfer the fuel fraction to the first control unit; and
calculate the fourth quantity of the second fuel as a function of at least two of the fuel mass, the fuel fraction and properties of the second fuel; and
the first control unit is further programmed to calculate the third quantity of the first fuel as a function of at least two of the fuel mass, the fuel fraction and properties of the first fuel.

17. The control system of claim 14, wherein the second control unit is further programmed to:
calculate the third quantity of the first fuel as a function of at least two of the fuel mass, the fuel fraction and properties of the first fuel;
calculate the fourth quantity of the second fuel as a function of at least two of the fuel mass, the fuel fraction and properties of the second fuel; and
transfer the third quantity of the first fuel to the first control unit.

18. The control system of claim 14, wherein the fuel fraction is any parameter such that the third quantity of the first fuel and the fourth quantity of the second fuel can be determined based on the fuel mass, the properties of the first fuel and the properties of the second fuel.

19. The control system of claim 14, wherein the fuel fraction is one of a first fraction of the first quantity, a second fraction of the second quantity, the third quantity, the fourth quantity, a first fraction of the first energy amount, a second fraction of the second energy amount, the third energy amount, the fourth energy amount, a ratio between the third and fourth quantities, and a ratio between the third and fourth energy amounts.

20. The control system of claim 1, wherein at least one of:
the first fuel injector, in operation, directly introduces the first fuel into a combustion chamber of the engine; and
the second fuel injector, in operation, directly introduces the second fuel into the combustion chamber.

21. The control system of claim 1, wherein the first control unit directly actuates the first fuel injector via the first connection.

* * * * *